United States Patent [19]
Wang et al.

[11] Patent Number: 6,089,027
[45] Date of Patent: *Jul. 18, 2000

[54] FLUID STORAGE AND DISPENSING SYSTEM

[75] Inventors: Luping Wang, Brookfield; Glenn M. Tom, New Milford, both of Conn.

[73] Assignee: Advanced Technology Materials, Inc., Danbury, Conn.

[ * ] Notice: This patent is subject to a terminal disclaimer.

[21] Appl. No.: 09/300,994

[22] Filed: Apr. 28, 1999

Related U.S. Application Data

[63] Continuation of application No. 09/067,393, Apr. 28, 1998.

[51] Int. Cl.[7] .............................. F17C 11/00; F17C 9/02
[52] U.S. Cl. ............................................. 62/46.1; 62/48.1
[58] Field of Search ................................. 62/45.1, 46.1, 62/48.1, 49.1, 51.1

[56] References Cited

U.S. PATENT DOCUMENTS

| | | | |
|---|---|---|---|
| 1,659,263 | 2/1928 | Harris . | |
| 1,679,826 | 8/1928 | Jenkins . | |
| 2,047,339 | 7/1936 | Thomas | 221/73.5 |
| 2,354,283 | 7/1944 | St. Clair | 50/21 |
| 2,502,588 | 4/1950 | Preston et al. | 62/1 |
| 2,553,486 | 5/1951 | Thomas | 62/1 |
| 2,615,287 | 10/1952 | Senesky | 50/23 |
| 2,707,484 | 5/1955 | Rush | 137/460 |
| 2,793,504 | 5/1957 | Webster | 62/1 |
| 3,388,962 | 6/1968 | Baumann et al. | 431/344 |
| 3,590,860 | 7/1971 | Stenner | 137/495 |
| 3,699,998 | 10/1972 | Baranowski, Jr. | 137/327 |
| 3,791,412 | 2/1974 | Mays | 137/614.11 |
| 3,972,346 | 8/1976 | Wormser | 137/505.42 |
| 3,994,674 | 11/1976 | Baumann et al. | 431/354 |
| 4,173,986 | 11/1979 | Martin | 137/613 |
| 4,485,739 | 12/1984 | Emmett | 102/200 |
| 4,624,443 | 11/1986 | Eidsmore | 251/65 |
| 4,694,860 | 9/1987 | Eidsmore | 137/614.21 |
| 4,744,221 | 5/1988 | Knollmueller | 62/48.1 |
| 4,793,379 | 12/1988 | Eidsmore | 137/614.19 |
| 4,836,242 | 6/1989 | Coffre et al. | 137/505.42 |
| 5,230,359 | 7/1993 | Ollivier | 137/14 |
| 5,233,837 | 8/1993 | Callahan | 62/24 |
| 5,289,690 | 3/1994 | Rockenfeller et al. | 62/77 |
| 5,303,734 | 4/1994 | Eidsmore | 337/305.43 |
| 5,409,526 | 4/1995 | Zheng et al. | 96/132 |
| 5,518,528 | 5/1996 | Tom et al. | 95/103 |
| 5,547,229 | 8/1996 | Eidsmore | 285/93 |
| 5,566,713 | 10/1996 | Lhomer et al. | 137/613 |
| 5,595,209 | 1/1997 | Atkinson et al. | 137/116.5 |
| 5,645,192 | 7/1997 | Amidzich | 222/1 |
| 5,673,562 | 10/1997 | Friedt | 62/48.1 |
| 5,678,602 | 10/1997 | Cannet et al. | 137/505.25 |
| 5,685,159 | 11/1997 | Kooy et al. | 62/50.1 |
| 5,692,381 | 12/1997 | Garrett | 62/60 |
| 5,694,975 | 12/1997 | Eidsmore | 137/489.5 |
| 5,752,544 | 5/1998 | Yves | 137/61 |
| 5,762,086 | 6/1998 | Ollivier | 137/1 |
| 5,901,557 | 5/1999 | Grayson | 62/45.1 |

OTHER PUBLICATIONS

ANSI/CGA V–1–1994 American National/Compressed Gas Association, Standard for Compressed Gas Cylinder Valve Outlet and Inlet Connections, Compressed Gas Assoc., Inc.
Integrated Flow Systems Inc., SR4 and SR3 Series Regulators with Operation and Features, 1700 Granite Creek Road, Santa Cruz, CA 95065.

*Primary Examiner*—William Doerrler
*Attorney, Agent, or Firm*—Steven J. Hultquist; Oliver A. M. Zitzmann

[57] ABSTRACT

A fluid storage and dispensing system comprising a vessel for holding a fluid at a desired pressure. The vessel has a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature. In another aspect, the vessel contains a solid-phase sorbent material having sorbable gas adsorbed thereon, at a pressure in excess of 50 psig. The vessel may have a >1 inch NGT threaded neck opening, to accommodate the installation of an interior regulator.

43 Claims, 5 Drawing Sheets

FLUID STORAGE AND DISPENSING SYSTEM

CROSS-REFERENCE TO RELATED APPLICATION

This is a continuation-in-part of U.S. patent application Ser. No. 09/067,393 filed Apr. 28, 1998 in the names of Luping Wang and Glenn M. Tom for "FLUID STORAGE AND GAS DISPENSING SYSTEM."

BACKGROUND OF THE INVENTION

1. Field of the Invention

This invention relates to a fluid storage and gas dispensing system which may be utilized to store high pressure liquid or other fluid, for dispensing of gas from the system and use of the dispensed gas in an application such as the manufacture of semiconductor devices and materials.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite. The arsine is subsequently dispensed by heating the zeolite to an elevated temperature of up to about 175° C. for sufficient time to release the arsine from the zeolite material.

The method disclosed in the Knollmueller patent is disadvantageous in that it requires the provision of heating means for the zeolite material, to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency, as well as safety concerns.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is subsequently required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, which overcomes the above-discussed disadvantages of the gas supply process disclosed in the Knollmueller patent. The gas storage and dispensing system of the Tom et al. patent comprises an adsorption-desorption apparatus, for storage and dispensing of a gas, e.g., a hydride gas, halide gas, organometallic Group V compound, etc. The gas storage and dispensing vessel of the Tom et al. patent reduces the pressure of stored sorbate gases by reversibly adsorbing them onto a carrier sorbent medium such as a zeolite or activated carbon material.

More specifically, such storage and dispensing system comprises: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly; wherein the solid-phase physical sorbent medium is devoid of trace components such as water, metals, and oxidic transition metal species (e.g., oxides, sulfites and/or nitrates) which would otherwise decompose the sorbate gas in the storage and dispensing vessel.

By the elimination of such trace components from the solid-phase physical sorbent medium, the decomposition of the sorbate gas after 1 year at 25° C. and interior pressure conditions is maintained at extremely low levels, e.g., so that not more than 1–5% by weight of the sorbate gas is decomposed.

The storage and dispensing vessel of the Tom et al. patent thus embodies a substantial advance in the art, relative to the prior art use of high-pressure gas cylinders. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

Prior copending U.S. patent application Ser. No. 09/067, 393 filed Apr. 28, 1998 in the names of Luping Wang and Glenn M. Tom describes a fluid storage and gas dispensing system including a storage and dispensing vessel for holding a fluid, e.g., a liquid at appropriate pressure whose vapor constitutes the fluid to be dispensed. The vessel includes an outlet port and is equipped with a dispensing assembly coupled to the outlet port, for example a valve head assembly including a dispensing valve and an outlet for selective discharge of gas deriving from liquid in the vessel.

In the Wang et al. system, a fluid pressure regulator is associated with the outlet port and may constitute part of a pressure regulator/phase separator assembly associated with the outlet port, e.g., at the neck of the vessel, to retain fluid in the vessel and, when the fluid is in liquid form, to prevent liquid from leaking to the dispensing valve and outlet. The pressure regulator and the optionally included phase separator are arranged to lie in the flow path of fluid dispensed from the vessel through the outlet port. The pressure regulator and the optionally included phase separator may be disposed interiorly or exteriorly of the vessel. Preferably, such elements are interiorly disposed, to minimize the possibility of impact and environmental exposure in use, and to minimize the leak path of the contained fluid from the vessel. When the pressure regulator and optionally included phase separator are interiorly disposed, the vessel may utilize a single weld or seam at the outlet port, to seal the vessel.

The phase separator in the Wang et al. system may comprise a porous membrane which is permeable to vapor or gas deriving from the liquid, but is not permeable to the liquid, and the phase separator preferably is disposed in a protective mode upstream of the pressure regulator so that when the contained fluid in the vessel is a liquid, the liquid is prevented from entering and interfering with the function of the pressure regulator in maintaining the liquid in the vessel, and preventing egress of liquid from the vessel.

The regulator is a flow control device, which can be set at a predetermined pressure level, to dispense gas or vapor from the cylinder at such pressure level. The pressure level set point may be superatmospheric, subatmospheric or atmospheric pressure, depending on the dispensing conditions, and the mode of gas discharge from the vessel.

The fluid storage and dispensing vessel of the parent Wang et al. patent application may be formed in the manner of a conventional high pressure gas cylinder, with an elongate main body portion having a neck of reduced cross-sectional area relative to the main body cross-section of the vessel. The vessel may in such conformation be amenable to conventional manufacture wherein the vessel is cleaned and then installed with a valve head assembly including a valve (manual or automatic) and associated pressure and flow control elements, in a manifold arrangement.

Although liquid is preferred as the contained fluid medium in the use of the fluid storage and gas dispensing system of Wang et al., it is also possible that high-pressure gas may be utilized as the fluid medium to be stored and selectively dispensed.

The storage and dispensing vessel of Wang et al. may be readily filled by setting the fluid pressure regulator at a suitably low pressure level so that the gas or vapor is at a pressure below the pressure regulator set point, using a conventional pressure regulator including a poppet element which may be biased with a biasing element such as a spring biasing element to a closed position, and which responds to pressure above the set point pressure by remaining closed, but which responds to pressure below the set point pressure by opening and allowing fluid flow therethrough.

Accordingly, the fill operation may be carried out to load the vessel with fluid to be stored and subsequently dispensed, by establishing an interior pressure level in the vessel at which the poppet element of the pressure regulator disengages from its seat, thereby allowing gas to flow into the vessel, in reverse flow fashion to the dispensing mode of the system. In this manner, the vessel may be fabricated with only one port, which thus functions to permit egress of gas from the vessel for dispensing, as well as permitting filling of the vessel with the fluid in the first instance, through the single port.

Alternatively, the vessel can be configured with dual fluid flow ports, which can accommodate separate fill and dispensing lines. For example, the dispensing port may be located at the neck of the vessel and be associated with a conventional valve head assembly, while the fill port may be provided at another location on the vessel structure.

The vessel of the Wang et al. system may be utilized for storage and dispensing of any suitable fluids, such as for example hydride fluids (e.g., arsine, phosphine, stibine, silane, etc.) and acid gases (e.g., hydrogen fluoride, hydrogen chloride, chlorine, boron trichloride, boron trifluoride, halogenated silanes and disilanes, etc.) for use in semiconductor manufacturing operations.

In use, a dispensing valve may be provided as part of the dispensing assembly associated with the port of the vessel, and such valve may be opened, manually or automatically, to permit gas to flow through the porous membrane or phase separator element, when present, and through the regulator for discharge of the gas from the fluid storage and dispensing system, and subsequent flow to a downstream process system, such as an ion implantation apparatus, chemical vapor deposition chamber, semiconductor equipment cleaning station, etc.

The Wang et al. system may thus be employed to practice a method for storage and dispensing of a fluid, comprising the steps of:

containing the fluid in a confined state against a fluid pressure regulator in a fluid flow path closed to fluid flow downstream of the fluid pressure regulator; and selectively dispensing the confined fluid by opening the fluid flow path to fluid flow downstream of the fluid pressure regulator, and discharging fluid at a rate determined by the fluid pressure regulator, optionally wherein the contained fluid is a liquid and the fluid during dispensing is phase-separated upstream of the fluid pressure regulator, to permit only gas to be discharged from the fluid contained in a confined state.

While the approach of the Wang et al. system is generally viable, it is possible that under long-term storage conditions of the fluid vessel, condensation of liquid on the downstream side of the membrane can occur. For example, if the vessel is reposed on its side and the liquid volume extends above the height of the permeable phase-separator membrane in such position, then a small potential gradient is present and is equal to the gravitational potential associated with such liquid "head." In order to equilibrate this liquid head potential, liquid will condense on the valve side of the membrane until the respective liquid levels on the opposing sides of the membrane have equalized. There is a need to remedy this shortcoming.

Additionally, for gas storage and dispensing vessels of the high pressure cylinder type, such as are conventionally employed for boron trifluoride ($BF_3$), the gas storage capacity of the system is usually determined and limited by the cylinder pressures. The pressures that would be necessary for liquefaction of the gas in such instances may be prohibitive, so that the Wang et al. system is not readily susceptible for such use. There is a need to remedy this shortcoming.

Further to the above, the gas cylinder vessels conventionally used for compressed gas service typically utilize valve inlets, as measured by National Gas Taper (NGT) standards, of ¾ inch NGT, ½ inch NGT, and smaller. In order to usefully exploit the Wang et al. system of the parent application, embodying a "regulator in a bottle" approach, larger cylinder inlets are required than are currently conventionally available. The Compressed Gas Association's (CGA's) largest recommended compressed gas cylinder inlet is a 1.5 inch NGT-11 ½ tpi (threads per inch) opening having a minimum diameter of 1.79 inch. Openings larger than ¾ inch NGT are typically designed for applications in which high flows and larger cylinders (>50 liters internal volume) are required. The inventors are not aware of any cylinders with volumes of less than 50 liters that have openings larger than 1 inch NGT, and it is very unlikely that any openings larger than 1 inch NGT have been employed for cylinders with volumes of less than 20 liters.

In order to commercially enable the Wang et al. "regulator in a bottle" approach of the parent patent application, it is necessary to provide a cylinder that satisfies United States Department of Transportation (USDOT) packaging standards, has a larger inlet opening than is conventionally available, and can withstand pressures in the range of from about 1000 to about 5000 pounds per square inch (psi). No such vessel has been proposed or fabricated by the prior art, and none is commercially available. There is a need to remedy this shortcoming.

There is therefore a need in the art to provide improved fluid storage and delivery systems for selective dispensing of gases that overcome the various deficiencies described above.

Relative to the state of the art and the invention as described more fully hereinafter, pertinent art includes the following references: U.S. Pat. No. 3,590,860 to Stenner (a manually adjustable regulator valve for a liquid propane cartridge, including a regulator diaphragm and actuating spring assembly); U.S. Pat. No. 4,836,242 to Coffre et al. (a pressure reducer for supplying electronic grade gas, including a bellows and inlet valve, with a solid particles filter disposed between the bellows and a low pressure outlet); U.S. Pat. No. 5,230,359 to Ollivier (a diaphragm-based pressure regulator for a high pressure gas cylinder, wherein a valve is positioned in the regulator for adjustably throttling the flow of pressurized fluid); U.S. Pat. No. 3,699,998 to Baranowski, Jr. (a calibratable pressure regulator in which leaf spring fasteners are utilized to retain the regulator components in position); U.S. Pat. No. 3,791,412 to Mays (a pressure reducing valve for high pressure gas containers, including a pair of valve elements for dispensing low pressure throttled fluid); U.S. Pat. No. 3,972,346 to Wormser (pressure regulator featuring a U-ring seal poppet assembly); U.S. Pat. No. 4,793,379 to Eidsmore (button-operated valve for main shut-off and flow control of a pressurized gas cylinder, using magnetic actuation of valve components); U.S. Pat. No. 2,615,287 to Senesky (a gas pressure regulator including diaphragm and diaphragm-clamping member elements); U.S. Pat. No. 4,173,986 to Martin (pressurized gas flow control valve including pressure regulator and responsive poppet valve structure); U.S. Pat. No. 3,388,962 to Baumann et al. (pressurized gas fuel metering device including sintered metal pellet flow element); U.S. Pat. No. 1,679,826 to Jenkins (fluid pressure regulator for high pressure container, utilizing diaphragm element and gas filtering means comprising a felt strip); U.S. Pat. No. 2,354,283 to St. Clair (fluid pressure regulator for liquefied petroleum gas tanks, comprising pressure actuated diaphragm with flow restrictor structure to minimize vibration); U.S. Pat. No. 5,566,713 to Lhomer et al. (gas flow control dispensing assembly including piston-type pressure regulator and block reducer/regulator means); U.S. Pat. No. 5,645,192 to Amidzich (valve assembly for relieving excess gas pressure in a container, comprising sealing ring/spring assembly); U.S. Pat. No. 5,678,602 to Cannet et al. (gas control and dispensing assembly for a pressurized gas tank, including reducer and regulator means with indexed flowmeter valve); U.S. Pat. No. 2,793,504 to Webster (valve for pressurized fluid container including pressure reducer and regulator and spring bias closure means); U.S. Pat. No. 1,659,263 to Harris (regulator for pressurized gas cylinder including a diaphragm and anti-friction washer between diaphragm and annular seat of regulator); U.S. Pat. No. 2,047,339 to Thomas (liquefied petroleum gas storage apparatus including flow control unit and leakage prevention valve); and U.S. Pat. No. 3,994,674 to Baumann et al. (detachable burner assembly for container of pressurized liquefied combustible gas, including a regulator valve assembly).

It is accordingly an object of the present invention to provide an improved fluid storage and dispensing system for the selective dispensing of gases, which overcomes the aforementioned deficiencies of prior practice.

It is another object of the invention to provide an improved fluid storage and dispensing system for the selective dispensing of gases, characterized by significant advantages in cost, ease of use, and performance.

Other objects and advantages of the invention will be more fully apparent from the ensuing disclosure and appended claims.

SUMMARY OF THE INVENTION

The present invention relates to a system for storage and dispensing of a fluid, for use in applications such as the manufacture of semiconductor products.

In one aspect, the present invention relates to a fluid storage and dispensing system, comprising:

a fluid storage and dispensing vessel enclosing an interior volume for holding a fluid, wherein the vessel includes a fluid flow port;

a fluid dispensing assembly coupled in fluid flow communication with the port;

a double-stage fluid pressure regulator associated with the port, and arranged to maintain a predetermined pressure in the interior volume of the vessel;

the fluid dispensing assembly being selectively actuatable to flow gas, deriving from the fluid in the interior volume of the vessel, through the double-stage fluid pressure regulator and fluid dispensing assembly, for discharge of the gas from the vessel.

In another aspect, the invention relates to a fluid storage and gas dispensing system, comprising:

a storage and dispensing vessel constructed and arranged for holding a liquid whose vapor constitutes the fluid to be dispensed, wherein the fluid is contained in the storage and dispensing vessel, at a pressure at which the fluid is in a liquid state;

the storage and dispensing vessel including a fluid flow port;

a dispensing assembly coupled to the outlet port; and a double-stage fluid pressure regulator/particulate filter assembly interiorly disposed in the vessel; and means for selectively actuating the dispensing assembly to effect flow of gas deriving from the liquid in the vessel, through the fluid regulator/particulate filter assembly and the dispensing assembly, for discharge of the gas from the system.

In a further aspect, the invention relates to a method for storage and dispensing of a fluid, comprising:

containing the fluid in a confined state against a multistage fluid pressure regulator in a fluid flow path closed to fluid flow downstream of the fluid pressure regulator; and selectively dispensing the confined fluid by opening the fluid flow path to fluid flow downstream of the fluid pressure regulator, and discharging fluid at a rate determined by the fluid pressure regulator.

Another aspect of the invention relates to a method of manufacturing a semiconductor product, comprising:

containing the fluid in a confined state against a multi-stage fluid pressure regulator in a fluid flow path closed to fluid flow downstream of the fluid pressure regulator;

selectively dispensing the confined fluid by opening the fluid flow path to fluid flow downstream of the fluid pressure regulator, and discharging fluid at a rate determined by the fluid pressure regulator; and using the discharged fluid in the manufacture of the semiconductor product.

A further aspect of the invention relates to a fluid storage and dispensing system comprising a vessel containing a physical adsorbent material having adsorbed thereon a gas at an internal pressure in the vessel of from about 50 psig to about 5000 psig, and a gas dispensing assembly coupled with the vessel and selectively operable to dispense gas from the vessel.

In an additional aspect, the invention relates to a semiconductor manufacturing system comprising a semiconductor manufacturing apparatus utilizing a gas, and a source of said gas, wherein such source comprises a vessel containing a physical adsorbent material having adsorbed thereon a gas at an internal pressure in the vessel of from about 50 psig to about 5000 psig, and a gas dispensing assembly coupled with the vessel and selectively operable to dispense gas from the vessel.

A still further aspect of the invention relates to a method for storage and dispensing of a fluid, comprising:

containing the fluid in an at least partially adsorbed state at a pressure in the range of from about 50 to about 5000 psig; and selectively dispensing the fluid by desorbing same from the adsorbed state and releasing same from containment.

Another aspect of the invention relates to a fluid storage and dispensing system, comprising a fluid storage and dispensing vessel enclosing an interior volume of less than about 50 liters and having an inlet opening larger than 1 inch NGT;

a fluid dispensing assembly arranged for selectively dispensing fluid from the vessel; and a fluid pressure regulator in the interior volume of the vessel, arranged to maintain a predetermined pressure therein.

The vessel may have an internal volume less than about 20 liters, and most preferably less than about 10 liters, e.g., in the range of from about 1 to about 10 liters. Such vessel may be configured and dimensionally sized and shaped as hereinafter more fully described. The vessel preferably has a pressure capability, i.e., a continuous service pressure level that can be accommodated without adverse effect (rupture of the vessel or leakage of fluid therefrom), of up to at least about 1000 pounds per square inch, and more preferably up to about 5000 pounds per square inch. The vessel may be arranged to selectively dispense to a downstream gas-consuming facility, e.g., a semiconductor manufacturing facility.

Yet another aspect of the invention relates to a semiconductor manufacturing system comprising a semiconductor manufacturing apparatus utilizing a gas, and a source of said gas, wherein said source comprises:

a fluid storage and dispensing vessel enclosing an interior volume of less than about 50 liters and having an inlet opening larger than 1 inch NGT;

a fluid dispensing assembly arranged for selectively dispensing fluid from the vessel; and a fluid pressure regulator in the interior volume of the vessel, arranged to maintain a predetermined pressure therein.

In another aspect, the invention relates to a fluid storage and dispensing vessel comprising a 2.0–2.25 liter DOT 3AA 2015 cylinder with a 1.5 inch NGT opening with a 1½–11½ NGT thread, a 4.187 to 4.25 inch outer diameter, a nominal wall thickness of 0.094 to 0.125 inch, and a length of 12.75 to 13.75 inches.

A still further aspect of the invention relates to a fluid storage and dispensing assembly comprising a vessel with an interior volume less than 50 liters and a >1 inch NGT neck opening, a dispensing assembly coupled to the neck opening, a regulator coupled to the dispensing assembly and disposed in the interior volume of the vessel.

Other aspects, features and embodiments in the invention will be more fully apparent from the ensuing disclosure and appended claims.

DETAILED DESCRIPTION OF THE INVENTION, AND PREFERRED EMBODIMENTS THEREOF

Figure 1:
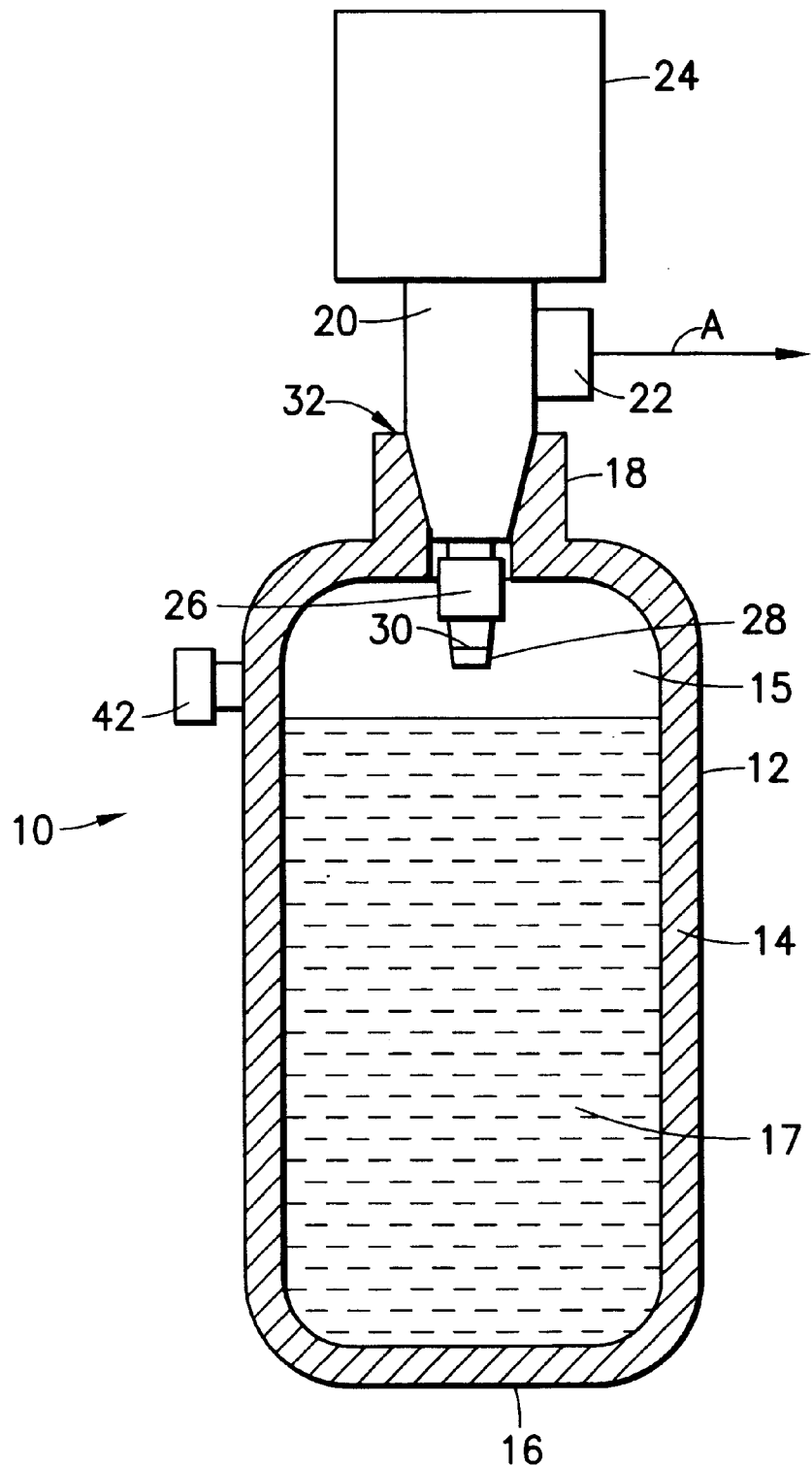
FIG. 1 is a schematic cross-sectional elevation view of a fluid storage and dispensing system according to one embodiment of the present invention.

The present invention is based on the discovery that a fluid storage and dispensing system, of a type presenting an alternative to the fluid storage and dispensing system of Tom et al. U.S. Pat. No. 5,518,528, may be easily fabricated by disposing a fluid pressure regulator between a confined liquid volume and a gas dispensing assembly including a gas flow control element such as a gas flow shut off valve, mass flow controller, or the like.

Ancillary to this discovery is the finding that the fluid pressure regulator may be advantageously interiorly disposed in the fluid storage and dispensing vessel, so that it is protected by the vessel, e.g., cylinder casing or housing, from impact, environmental exposure and damage.

Although the fluid pressure regulator is preferably interiorly disposed in the fluid storage and dispensing vessel, it is possible to dispose such element exteriorly of the vessel in the broad practice of the invention. The invention therefore broadly contemplates the provision of interiorly as well as exteriorly disposed fluid pressure regulator devices associated with the fluid flow port of the vessel.

The fluid pressure regulator may be of any suitable type, e.g., the SR4 series set pressure regulator commercially available from Integrated Flow Systems, Inc. As discussed in the Summary of the Invention section hereof, the fluid pressure regulator may be of a poppet valve type, comprising a poppet element that is biased to a seat structure to prevent flow at a pressure above a set point value.

The set point may be a "native" or fixed set point device, or the device may comprise a variable set point (adjustable) device. Preferably, the fluid pressure regulator is a variable, adjustable device as regards its set point pressure. The fluid pressure regulator may by way of example be set to an appropriate level, e.g., 700 Torr, to provide flow of dispensed fluid from the storage and dispensing vessel at such set point pressure level when the dispensing assembly associated with the fluid flow port of the vessel is opened to flow, such as by opening of a flow control valve of the dispensing assembly.

The fluid medium in the fluid storage and dispensing vessel may be any suitable fluid medium at any appropriate fluid storage conditions, e.g., a high pressure gas or alternatively a liquid, at the set point pressure determined by the fluid pressure regulator, as the source of the gas to be dispensed. Thus, the gas source in the system may be a high pressure gas or a liquefied gas.

Optionally and desirably, a phase separator is utilized to prevent liquid leakage across the regulator valve seat when the gas source is a high pressure liquid. The phase separator may be of any suitable form, but preferably comprises a porous membrane that is permeable to gas or vapor of the contained liquid, but is impermeable to the liquid phase. Suitable materials for such phase separator permeable membrane include various polymeric material films of appropriate porosity and permeability characteristics, and so-called "breathable" fabrics such as those commercially manufactured by W. L. Gore & Associates, Inc. (Elkton, Md.) under the trademarks "Gore-Tex," "Activent," "DryLoft," and "Gore Windstopper."

The pressure regulator and the phase separator may be utilized in combination with one another in an assembly which may be interiorly disposed in the fluid storage and dispensing vessel or disposed exteriorly thereof. Preferably, such fluid pressure regulator and phase separator assembly is interiorly disposed in the storage and dispensing vessel.

The fluid utilized in the fluid storage and dispensing vessel of the invention may comprise any suitable fluid, such as for example a hydride fluid for semiconductor manufacturing operations. Examples of hydride fluids of such type include arsine, phosphine, stibine, silane, chlorosilane, and diborane. Other fluids useful in semiconductor manufacturing operations may be employed, including acid gases such as hydrogen fluoride, boron trichloride, boron trifluoride, hydrogen chloride, halogenated silanes (e.g., $SiF_4$) and disilanes (e.g., $Si_2F_6$), etc., having utility in semiconductor manufacturing operations as halide etchants, cleaning agents, source reagents, etc.

The fluid storage and dispensing vessel of the invention may be readily constructed utilizing conventional fluid pressure regulator devices. In relation to the sorbent-based gas storage and dispensing system described in U.S. Pat. No. 5,518,528, the fluid storage and dispensing vessel of the present invention provides a significantly greater fluid storage capacity, when the fluid is in the liquid phase.

By way of example, for a sorbent-based gas storage and dispensing system of the type shown and described in U.S. Pat. No. 5,158,528, using a "JY" cylinder as the storage and dispensing vessel, and containing a physical sorbent material having sorptive affinity for the gas to be dispensed, typically delivers, in the case of arsine gas, on the order of about 0.5 kilogram of gas.

In the corresponding vessel of the fluid storage and gas dispensing system of the present invention, one liter of liquid arsine can be stored and 1.8 kilograms of arsine gas can be dispensed therefrom.

The fluid storage and dispensing system of the present invention permits high purity dispensing of the fluid, free of potential contaminants or impurities characteristically present in sorbent materials utilized in sorbent-based storage and dispensing systems of the prior art.

Further, the fluid storage and dispensing system of the present invention affords a high level of safety in the deployment of fluids, in that the storage and dispensing vessel may be fabricated with an interiorly disposed pressure regulator and optional phase separator, and the seam associated with the fluid flow port of the vessel will constitute the only leak path in the otherwise seamless vessel construction. Further, in the case of a conventional fluid cylinder, because of the relative small size of the cylinder neck in contrast to the cross section of the body of the vessel, a minimal leak path for ingress or egress of gas is provided, which can be easily rendered leak-tight, by brazing, welding, adhesively sealing with a highly fluid impermeable sealant, etc.

Additionally, as mentioned, it is feasible to construct the fluid storage and dispensing vessel with only a single fluid flow port. If the fluid pressure regulator is set at a suitable pressure level, e.g., 700 Torr, then the vessel may be lowered in temperature to the point that the gas vapor pressure (of the fluid to be dispensed) is below the regulator set point. Under these conditions the poppet element of the regulator will disengage from its seat and allow gas to flow into the storage vessel from an exterior source.

Referring now to the drawings, FIG. 1 is a schematic cross-sectional, elevation view of a liquid storage and gas dispensing system 10 according to one embodiment of the present invention.

The fluid storage and gas dispensing system 10 includes a storage and dispensing vessel 12 including a cylindrical side wall 14, a bottom floor 16 and an upper neck portion 18, defining an enclosed interior volume 15 holding the liquid 17. Liquid 17 may comprise any suitable liquid such as a liquid hydride for use in semiconductor manufacturing operations. Illustrative hydrides include arsine, phosphine, stibine, silane, diborane, etc. The liquid 17 is maintained under sufficient pressure in vessel 12 so as to remain in a liquid phase.

Disposed in the upper neck portion 18 of the vessel 12 is a valve head assembly comprising valve 20 communicating with valve outlet 22, from which vapor is dispensed from the vessel in the direction indicated by arrow A.

The valve 20 is shown with an associated actuator 24, which may be of any suitable type (electrical, pneumatic, etc.) as desired in the given end use application of the invention. Alternatively, the valve 20 may be manually actuated, or provided with other flow control means.

The valve 20 is joined in gas flow communication with the pressure regulator 26, which is of a conventional type employing a poppet element which may for example be spring biased in a closed condition and wherein the poppet is subject to displacement when the pressure differential across the poppet element exceeds a certain level. The pressure regulator 26 may for example be set to a subatmospheric, atmospheric or superatmospheric pressure value, e.g., 700 Torr. The specific pressure level is chosen with respect to the liquid or other fluid contained in the vessel, as appropriate to the storage and dispensing operation.

Coupled with the pressure regulator 26 is a phase separator 28 including a membrane element 30, which is permeable to gas or vapor deriving from the liquid 17, but is impermeable to the liquid itself.

The vapor/gas-permeable, liquid-impermeable membrane may be formed of any suitable material that transmits only the gas or vapor from the liquid but precludes liquid flow therethrough. The membrane may in practice be formed of a wide variety of potentially useful materials, including, for example, polypropylene, polyvinylidene fluoride, polytetrafluoroethylene, polyfluoroacetate, silicone, and surface-treated glass fabrics. One preferred useful material comprises polyvinylidene fluoride "breathable" fabrics such as those commercially marketed under the trademark "Gore-Tex®" (Gore-tex Corporation). Other commercially available materials for use as membrane phase separator materials include Noryl film (General Electric Company, Pittsfield, Mass.).

In use of the liquid storage and gas dispensing system of FIG. 1, the liquid is stored at a predetermined pressure ensuring its liquidity. For this purpose, the pressure regulator 26 is set at a predetermined level ensuring the appropriate interior pressure in the interior volume 15 of the vessel. The liquid-impermeable, gas/vapor-permeable membrane 30 ensures that no liquid will flow into the gas regulator 26, even if the vessel is tilted from the vertical attitude shown in FIG. 1 while remaining generally upright.

When it is desired to dispense gas from the vessel 12, the valve actuator 24 is actuated to open valve 20, thereby permitting gas or vapor deriving from the liquid to flow through the permeable membrane 30, the pressure regulator 26 and the valve 20, for egress from the valve head dispensing assembly through outlet 22.

The opening of the valve 20 effects a reduction of the pressure on the discharge side of the permeable membrane 30 and causes permeation of vapor deriving from the liquid through the membrane, for discharge. At the same time, the fluid pressure regulator will maintain the pressure of the gas being dispensed at the set point pressure level.

The vessel 12 in the FIG. 1 embodiment may as shown be equipped with a separate fill port 42 (in relation to the fluid flow port at the neck of the vessel), and such separate fill port may be coupled to a source of liquid for filling of the vessel.

Alternatively, the vessel may simply be provided with one neck opening, with the pressure regulator set at an appropriate temperature level for filling. In the filling operation, the vessel may be chilled, as by placement of the vessel in a cryostat or coolant bath, to reduce the temperature of the vessel below the point of the predetermined pressure established by the pressure regulator. The fluid pressure regulator then will have a gas pressure in the interior volume 15 of the vessel which is below the set point of the regulator, thereby allowing the poppet element of the pressure regulator to disengage from its seat and allow ingress of fluid to the vessel, for subsequent storage of the liquid therein.

Figure 2:
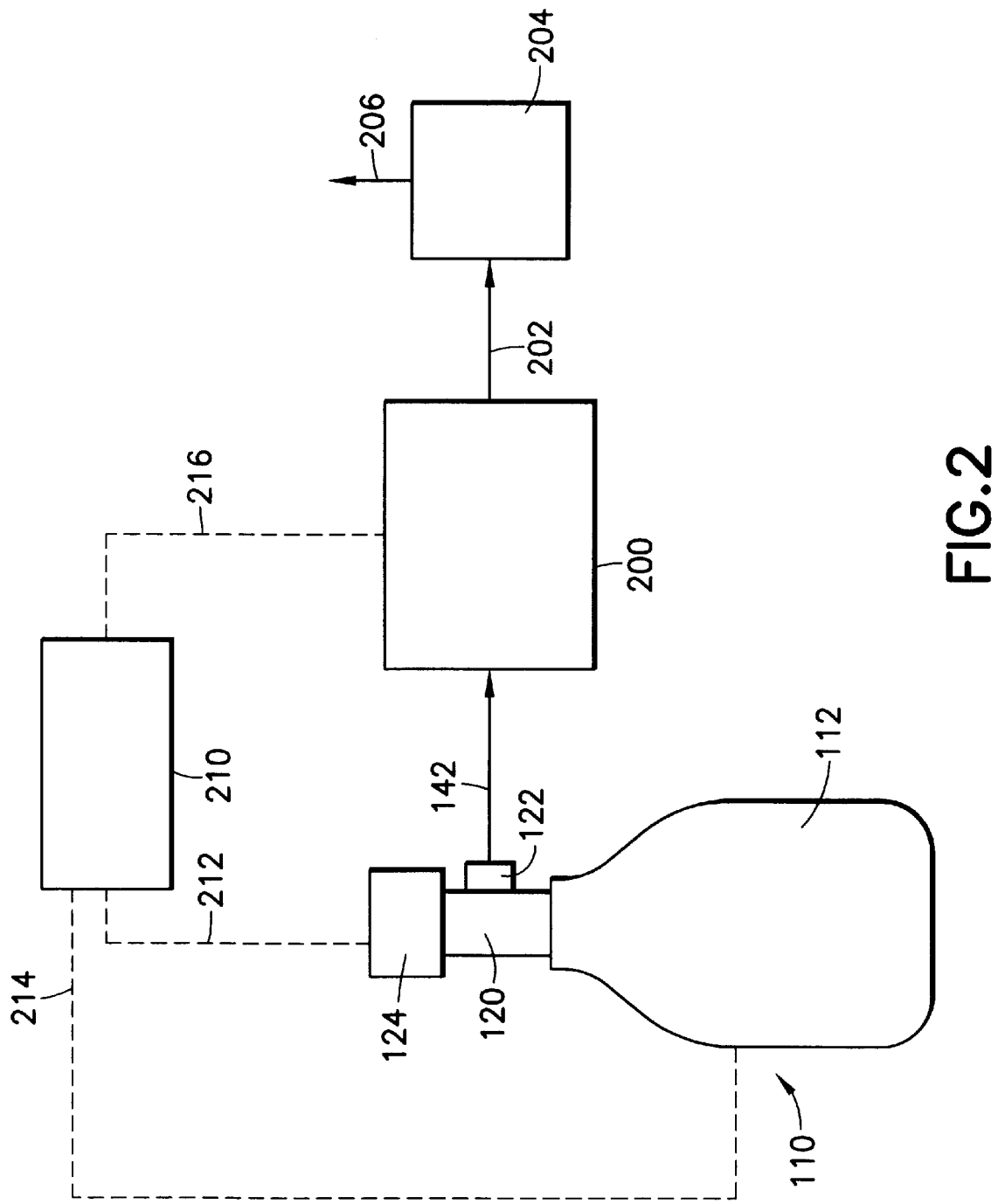
FIG. 2 is a schematic representation of a semiconductor manufacturing facility utilizing a fluid dispensed from a storage and dispensing system of the type shown in FIG. 1, in accordance with a further embodiment of the invention.

FIG. 2 is a schematic representation of a semiconductor manufacturing system utilizing a fluid storage and dispensing system 110 in accordance with the present invention. The fluid storage and dispensing system 110 includes a generally cylindrical vessel 112 constructed generally along the lines of vessel 12 in FIG. 1. The vessel holds liquid at a predetermined pressure. The valve head assembly comprises a valve 120 with an actuator 124 being arranged to selectively actuate the valve and effect discharge of gas from the vessel in line 142.

The valve actuator 124 is controlled by central processor unit 210, which may comprise a computer or microprocessor control apparatus, coupled in controlling relationship with the valve actuator 124 by means of signal transmission line 212.

The central processor unit 210 may be constructed and arranged to actuate the valve according to a cycle time program. Alternatively, the central processor unit 210 may monitor a process condition in the semiconductor manufacturing facility 200 by means of process condition signal transmission line 216 which conveys a signal indicative of a given process condition to the central processor unit, causing the unit to responsively actuate the valve actuator 124 to a corresponding extent, to modulate the gas flow in line 142 in proportion to the needs of the semiconductor manufacturing facility.

The central processor unit 210 may also receive a signal correlative of the temperature of the vessel in signal transmission line 214, which may be joined to a thermal sensor or embedded thermocouple associated with vessel 112, to compensate the flow of fluid in line 142 in relation to the temperature of vessel 112.

The semiconductor manufacturing facility 200 may comprise any suitable arrangement of semiconductor process equipment for the production of semiconductor materials or devices, or products containing such materials or devices.

For example, the semiconductor manufacturing facility 200 may comprise an ion implantation system, lithotracks, chemical vapor deposition reactor and associated reagent supply and vaporization equipment (including liquid delivery equipment, bubblers, etc.), etch unit, cleaning apparatus, etc.

In one particular embodiment of the present invention, a liquid hydride fluid is maintained under pressure in vessel 112 and gas derived therefrom is selectively dispensed in line 142 to the semiconductor manufacturing facility 200 comprising an ion implantation chamber. The dispensed gas, together with suitable carrier and/or diluent gas(es), is subjected to ionization, and the resulting ion species are implanted in a substrate such as a semiconductor device precursor structure or subassembly.

The semiconductor manufacturing facility 200 subsequent to use of the dispensed gas, discharges an effluent gas stream in line 202 which may be flowed to an effluent gas treatment system 204, for treatment and discharge of final purified effluent in line 206.

It will be recognized that the semiconductor manufacturing facility may be widely varied and configured, as for example to employ a multiplicity of process gases which may be dispensed from corresponding individual fluid storage and dispensing vessels constructed and operated in accordance with the present invention.

It will also be recognized that the fluid storage and dispensing apparatus of the present invention provides a highly effective and readily fabricated means for high capacity storage and delivery of fluids such as arsine, which are able to be liquefied under pressure without undue effort or expense.

Further, by interiorly disposing a fluid pressure regulator in the interior volume of fluid storage and dispensing vessel, the vessel may be fabricated with only a single seam at its neck portion as a potential leakage path for ingress or egress of fluid species. Accordingly, the vessel may be readily fabricated, and in use, the interiorly disposed gas pressure regulator is protected from impact as well as environmental exposure, which could otherwise deleteriously affect the structural integrity or operation of the vessel, as well as constituting an additional potential leak path for the storage and dispensing vessel.

In the fluid storage and dispensing system of the invention, including a fluid storage and dispensing vessel of the above-described type featuring a fluid flow port, with a fluid dispensing assembly coupled in fluid flow communication with the port, the regulator that is associated with the port according to the invention may suitably comprise a double stage regulator, to resolve the phase separation issue described in the Background of the Invention section hereof.

If the storage and dispensing vessel utilizes a single stage regulator in combination with a phase-separator unit, the vessel if reposed on its side may contain sufficient liquid so that the liquid volume extends above the height of the permeable phase-separator membrane. Under such condition, liquid will condense on the valve side of the membrane until the respective liquid levels on the opposing sides of the membrane have equalized.

The use of a double stage regulator obviates such shortcoming. If liquid from the bulk interior volume of the vessel moves between the first and second stage of the double stage regulator, the pressure-sensitive element of the high-pressure stage of the double stage regulator (the high-pressure stage being the stage of the regulator in initial fluid flow communication with the liquid in the vessel, and the low-pressure stage being the stage of the regulator in subsequent fluid flow communication to the first stage) will be forced to a closed position. Typically, the pressure-sensitive element of the respective regulator stages is a poppet valve. As the high-pressure stage is forced closed and the pressure in the interstage region (between the high-pressure stage and the low-pressure stage) rises, such increased interstage pressure will have little impact on the final pressure of the fluid discharged from the second stage.

The pressure set point for the high-pressure stage of the two-stage regulator can be set to any suitable pressure level above the pressure of the final stage (low-pressure stage) of the dual stage regulator. By such arrangement, the liquid condensation issue of the single stage regulator arrangement is resolved, without impact on the overall operation of the fluid storage and dispensing system, including the fill operation (fluid charging) of such system.

Accordingly, the storage and dispensing system utilizing a dual stage regulator may be configured as generally shown in FIG. 1, described hereinabove, but wherein the pressure regulator 26 is a dual stage regulator rather than a single stage regulator. The double-stage fluid pressure regulator thereby is associated with the port of the vessel, and is arranged to maintain a predetermined pressure in the interior volume of the vessel.

Another aspect of the invention relates to a fluid storage and dispensing system comprising a vessel containing a physical adsorbent material with sorptive affinity for a gas, e.g., a gas selected from the group consisting of hydride gases, halide gases and organometallic compound gases. A gas of such type (i.e., one for which the physical adsorbent material has a sorptive affinity) is contained in the vessel at an internal vessel pressure of from about 50 to about 5000 pounds per square inch gauge (psig). Preferably, from about 5 to about 40% of such gas is present in a free (unadsorbed) state and from about 60 to about 95% of such gas is present in an adsorbed state on the physical sorbent material.

The vessel in which the adsorbent material is contained may be constructed and arranged with a dispensing assembly or other discharge means, as described in U.S. Pat. No. 5,528,518, issued May 21, 1996 in the names of Glenn M. Tom and James V. McManus, the disclosure of which hereby is incorporated herein by reference in its entirety. The vessel may alternatively be constructed as shown in FIG. 1 hereof, but wherein the liquid 17 is replaced by a bed of physical adsorbent material sorptively retaining a gas species which also is present in the interstices of the physical adsorbent bed as well as in the head space in the interior volume of the vessel.

Although the prior art has disclosed sorbent-based gas storage and dispensing systems of the type referred described in U.S. Pat. No. 5,528,518 as having utility for gas storage and dispensing at pressures above atmospheric pressure, e.g., U.S. Pat. No. 5,704,967 issued Jan. 6, 1998 to Glenn M. Tom et al. (which describes superatmospheric pressure "below about 1200 torr"), the prior art has not contemplated that such sorbent-based gas storage and delivery systems could be usefully employed as a gas source at significantly higher pressures, e.g., above about 50 psig, and more preferably above about 100 psig. The reason for this circumstance is that on initial consideration, it would appear that the occlusion of volume by the physical mass of the sorbent material would be disadvantageous, creating a "lost volume" which would reduce the net amount of the gas which could be stored in the vessel.

Against this circumstance, it has been surprisingly and unexpectedly discovered that deployment of a sorbent-based gas storage and dispensing system utilizing high pressure storage conditions in the interior volume of the vessel provides a striking improvement in the storage capacity of the vessel containing the sorbent. By filling the cylinder with a solid phase physical adsorbent material, preferably in a divided form, as described in the aforementioned Tom et al. U.S. Pat. No. 5,518,528, adsorbable gas can be stored in the cylinder in a physical state akin to a liquid phase, with a greatly enhanced gas storage capacity as compared to conventional high pressure gas cylinders.

Such unexpected enhancement of gas storage capacity is illustratively shown by the data in Table I below, in which the storage capacity of $BF_3$ is compared in an adsorbent-filled gas cylinder and in a conventional gas cylinder at room temperature (20° C.). The adsorption capacity of $BF_3$ in Table I is determined using a computer model having a predictive reliability of ±20%, for a gas storage and dispensing vessel of 2.2 liters internal volume (equivalent to a commercially available "JY" cylinder), with the adsorbent being a bead activated carbon sorbent material of the type disclosed in Tom et al. U.S. Pat. No. 5,704,965, the disclosure of which hereby is incorporated herein by reference in its entirety.

TABLE I

|  | Adsorbent Filled Cylinder | | | High Pressure Cylinder | | |
| --- | --- | --- | --- | --- | --- | --- |
| Pressure (psig) | Adsorbed BF3 (g) | Free BF3 (g) | Total (g) | Adsorbed BF3 (g) | Free BF3 (g) | Total (g) |
| 0 | 220 | 3 | 223 | 0 | 6 | 6 |
| 100 | 569 | 24 | 593 | 0 | 48 | 46 |
| 500 | 836 | 109 | 945 | 0 | 218 | 218 |
| 800 | 889 | 173 | 1062 | 0 | 346 | 346 |
| 1000 | 906 | 215 | 1121 | 0 | 430 | 430 |
| 1500 | 925 | 321 | 1246 | 0 | 642 | 642 |

As shown by the data in Table I, the total amount of boron trifluoride contained in the cylinder filled with adsorbent is consistently greater than the amount of boron trifluoride contained in the conventional (adsorbent-free) gas cylinder. For example, at 100 psig, the total amount of boron trifluoride contained in the cylinder filled with adsorbent is 12.35 times greater than the amount of boron trifluoride contained in the conventional (adsorbent-free) gas cylinder. At 1500 psig, the total amount of boron trifluoride contained in the cylinder filled with adsorbent is 1.94 times greater than the amount of boron trifluoride contained in the conventional (adsorbent-free) gas cylinder.

According to another aspect of the invention, a fluid storage and dispensing system according to the present invention, including a fluid storage and dispensing vessel with a fluid flow port, a fluid dispensing assembly in fluid flow communication with the port, and a fluid pressure regulator associated with the port, may be configured with the following features:

(i) an internal volume of less than about 50 liters, more preferably less than about 20 liters, and most preferably less than about 10 liters, e.g., in the range of from about 1 to about 10 liters; and (ii) an inlet opening larger than 1 inch NGT.

Such vessel preferably has a pressure capability, i.e., a continuous service pressure level that can be accommodated without adverse effect (rupture of the vessel or leakage of fluid therefrom), of up to at least about 1000 pounds per square inch, and more preferably up to about 5000 pounds per square inch.

In one embodiment, such vessel may be of 2.0 liters internal volume with a 1.5 inch NGT cylinder valve inlet, so that the inlet opening is sufficiently large to fit a regulator device such as an IFS set point regulator.

For the "regulator in a bottle" configuration, an inlet opening of such character (>1 inch NGT) is necessary, since (1) the diameter of a regulator such as the IFS set point regulator is typically greater than 1.5 inch and less than 1.6 inch, which requires an opening on the order of 1.5 inch NGT in order for the regulator to fit inside the cylinder, and (2) an NGT opening is the only accepted and USDOT approved cylinder inlet for applications involving the storage and delivery of gases such as $BF_3$, $AsH_3$, $F_2$, $PH_3$, $SiH_4$, etc. Any other type of cylinder valve inlet such as an externally threaded connection or a straight thread is not currently accepted as a legally permissible connection by the USDOT for such gases.

In the manufacture of vessels of such type with a >1 inch NGT inlet opening, the process fabrication steps typically include:

(1) cold pressing a metal disk into a cylindrical cup;

(2) forming the cylinder neck by hot metal spinning; and (3) fabricating the cylinder opening in the neck of the vessel utilizing either a manual or an automated machining process.

A specific embodiment of the vessel of such type comprises a 2.0–2.25 liter DOT 3AA 2015 cylinder with a 1.5 inch NGT opening with a 1½–11½ NGT thread, with the vessel having a 4.187 to 4.25 inch outer diameter, a nominal wall thickness of 0.094 to 0.125 inch, a nominal neck outer diameter of 2.5 inches, a maximum neck inner diameter of 1.5 inches as spun, and a length of 12.75 to 13.75 inches. Such a vessel is suitable for use with boron trifluoride as the gas species being stored in and dispensed from the vessel.

Figure 3:
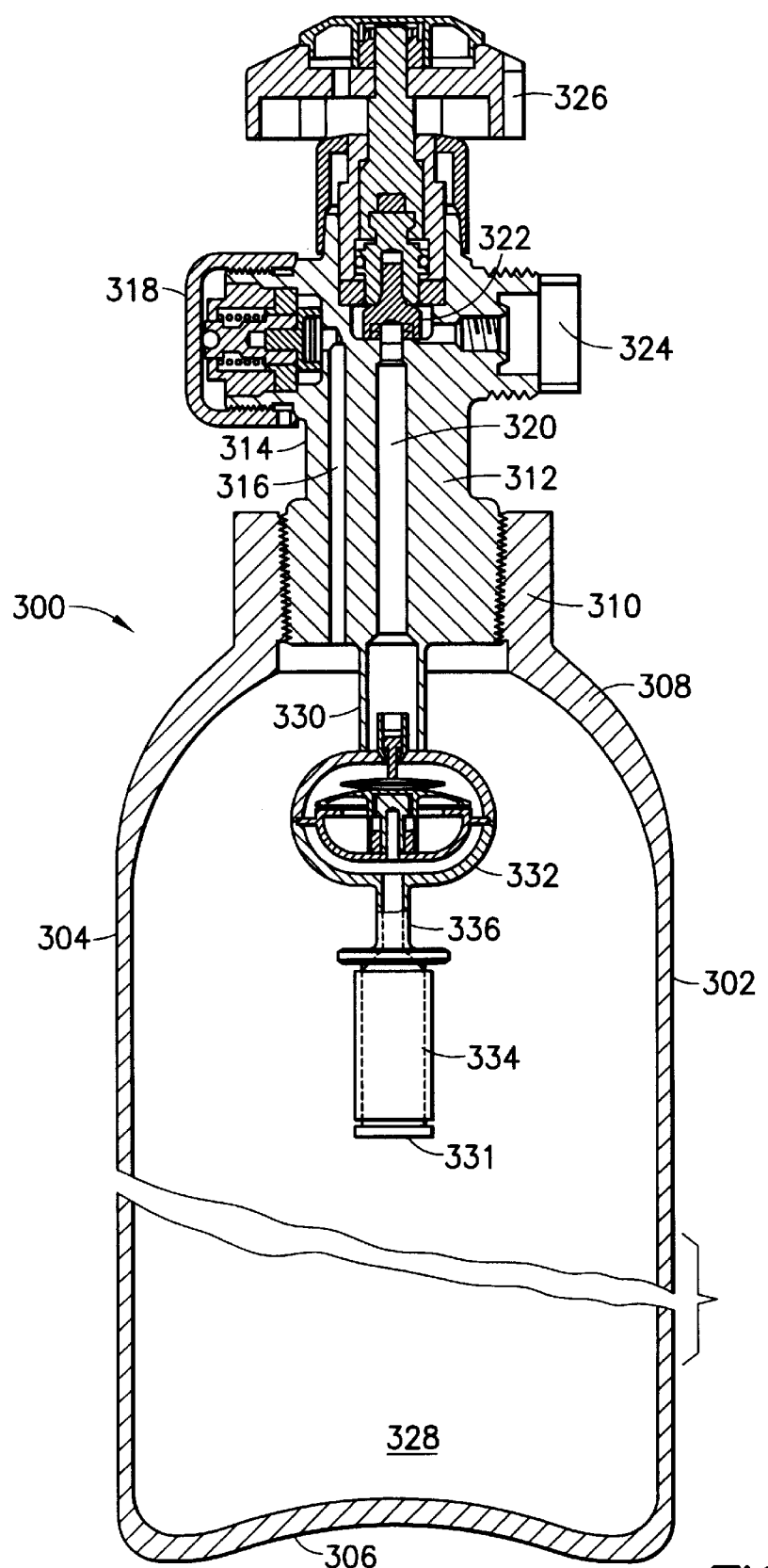
FIG. 3 is a schematic cross-sectional elevation view of a fluid storage and dispensing system according to another embodiment of the present invention.

FIG. 3 is a schematic cross-sectional elevation view of a fluid storage and dispensing system 300 according to an illustrative embodiment of the present invention. The system 300 includes a fluid storage and dispensing vessel 302 of generally cylindrical form, with cylindrical side wall 304 closed at its lower end by floor member 306. At the upper end of the vessel is a neck 308 including a cylindrical collar 310 defining and circumscribing a top opening of the vessel. The vessel wall, floor member and neck thereby enclose an interior volume 328 as shown.

At the neck of the vessel, a threaded plug 312 of the valve head assembly 314 is threadably engaged with the interior threaded opening of the collar 310. The valve head assembly 314 includes a central fluid flow passage 320 joined in fluid flow communication with a central working volume cavity in the valve head assembly. The central working volume cavity is in turn joined to outlet 324, which may be exteriorly threaded or otherwise constructed for attachment of a connector and associated piping, conduit, etc. thereto.

Disposed in the central working volume cavity is a valve element 322 that is joined to a hand wheel 326 in the embodiment shown, but may alternatively be joined to an automatic valve actuator or other controller or actuating means.

The valve head assembly 314 also features in the valve block a vent flow passage 316 joined to an over-pressure relief valve 318 and communicating with the interior volume 328 of the vessel, for relief of gross over-pressure conditions in the vessel.

The central fluid flow passage 320 in the valve head assembly 314 is joined at its lower end to a connector flow tube 330, to which in turn is joined to the regulator 332. The regulator is set to maintain a selected pressure of the fluid discharged from the vessel. At the lower end of the regulator is joined a tubular fitting 336 which in turn is joined, e.g., by butt welding, to a diffuser unit 334 having a diffuser end cap 331 at its lower extremity. The diffuser unit may be formed of stainless steel, with the diffuser wall being formed of a sintered stainless steel such as 316L stainless steel. The diffuser unit has a wall porosity that permits removal of all particles greater than a predetermined diameter, e.g., greater than 0.003 micrometers at 30 standard liters per minute flow rate of gas from the system. Filter diffuser units of such type are commercially available from Millipore Corporation (Bedford, Mass.) under the trademark WAFERGARD.

In use, a suitable fluid reagent is contained in the interior volume 328 of the vessel 302, e.g., a high pressure gas or a liquefied gas, or alternatively a sorbable gas sorptively retained on a physical sorbent having sorptive affinity for the gas, wherein the interior volume contains a bed of suitable solid-phase physical sorbent material. The fluid pressure regulator 332 is set to a selected set point to provide flow of dispensed fluid when the valve in the valve head assembly 314 is opened, with the fluid flowing through the diffuser unit 334, fitting 336, regulator 332, connector flow tube 330, central fluid flow passage 320 in the valve head assembly 314, the central working volume cavity, and outlet 324. The valve head assembly may be joined to other piping, conduits, flow controllers, monitoring means, etc. as may be desirable or required in a given end use application of the invention.

Figure 4:
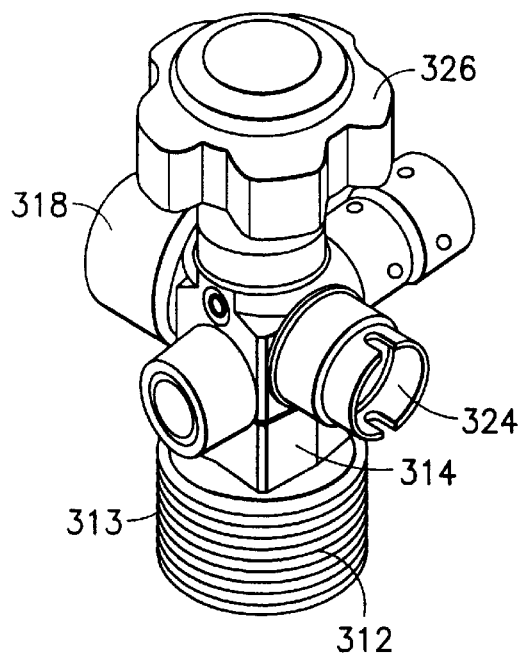
FIG. 4 is a perspective view of the valve head assembly of the FIG. 3 fluid storage and dispensing system.

FIG. 4 is a perspective view of the valve head assembly 314 of the FIG. 3 fluid storage and dispensing system. In FIG. 4, wherein corresponding elements are correspondingly numbered to FIG. 3, the plug 312 is shown as being provided with threading 313 complementary to threading on the inner surface of the collar 310, whereby the plug of the valve head assembly and the vessel may be complementarily mated with one another in a leak-tight fashion.

Figure 5:
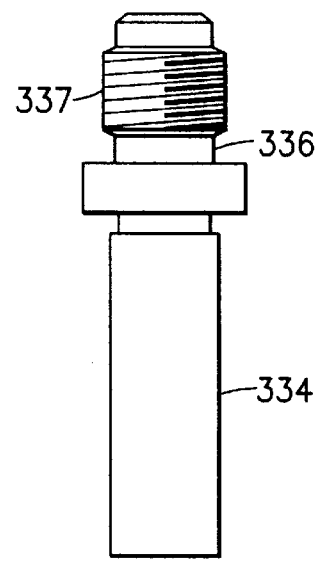
FIG. 5 is an elevation view of the diffuser unit employed in the FIG. 3 fluid storage and dispensing system.

FIG. 5 is an elevation view of the diffuser unit 334 employed in the FIG. 3 fluid storage and dispensing system 300. The diffuser unit 334 as shown has a tubular fitting portion that is threaded with threading 337, for matable engagement with the housing of the regulator 332 shown in FIG. 3.

Figure 6:
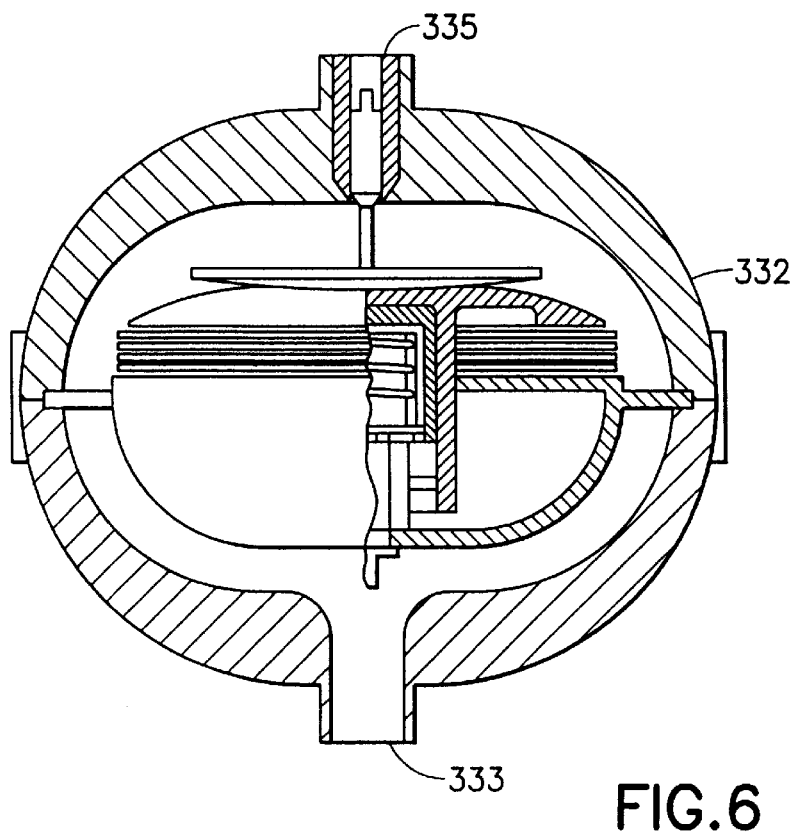
FIG. 6 is a partially broken away view of the regulator of the FIG. 3 fluid storage and dispensing system.

FIG. 6 is a partially broken away view of the regulator 332 of the FIG. 3 fluid storage and dispensing system 300. The regulator 332 as illustrated has a lower fluid inlet 333, to which the tubular fitting of the diffuser unit is threadably joined. The regulator 332 at its upper end is provided with a fluid outlet 335 that is joined to connector flow tube 330 as shown in FIG. 3. The regulator may be a single stage regulator or a multiple stage regulator. As mentioned, a double stage regulator has the advantage that it overcomes the fluid condensation problems attendant the use of membrane phase separators, relative to overturning or tilting of the vessel, and the vessel may employ a single or multiple stage regulator, without such a membrane phase separator unit, and with or without the particulate-filtering diffuser unit, as may be desired in a given end-use application of the present invention.

Figure 7:
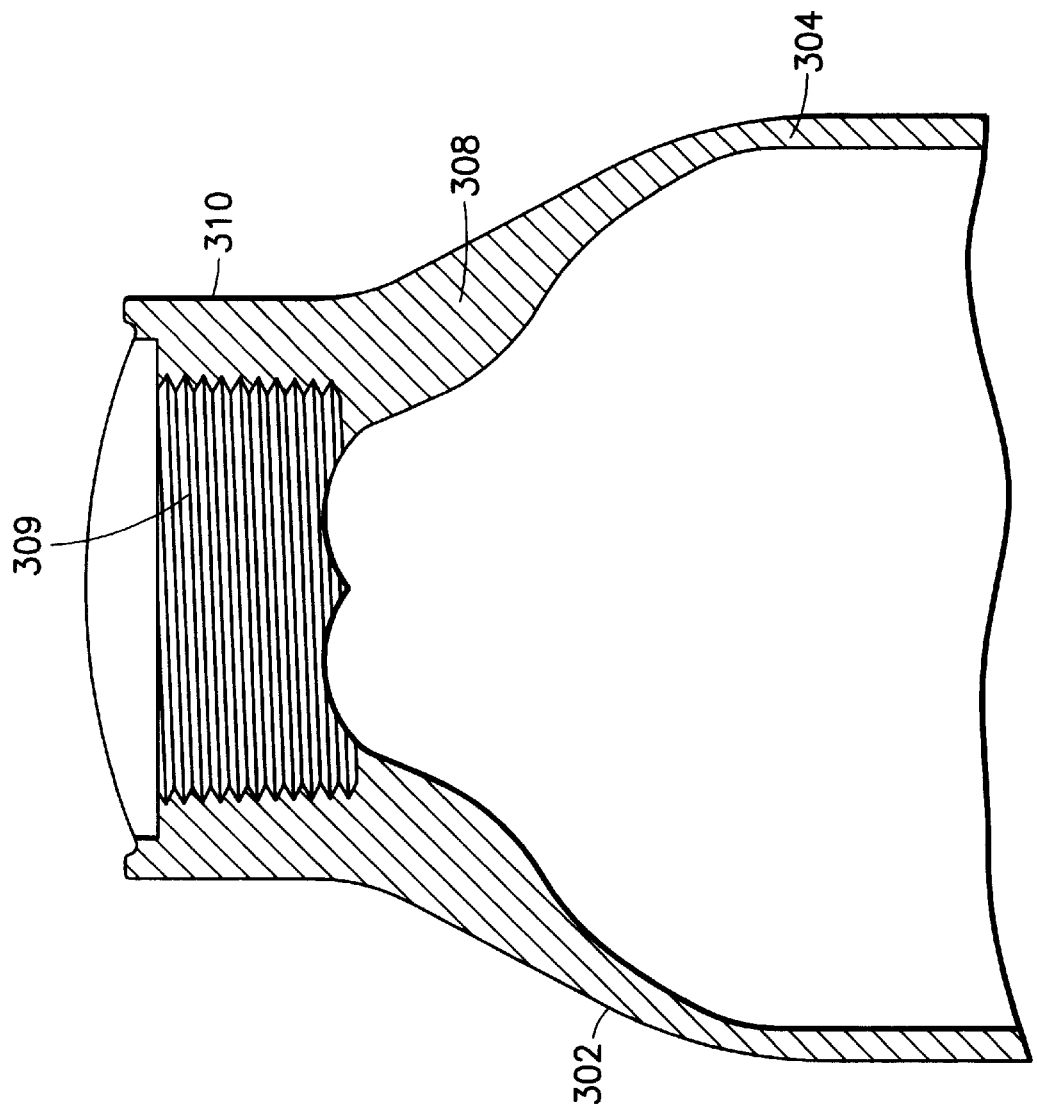
FIG. 7 is a sectional elevation view of an upper section of the fluid storage and dispensing vessel of the FIG. 3 fluid storage and dispensing system.
Figure 3:
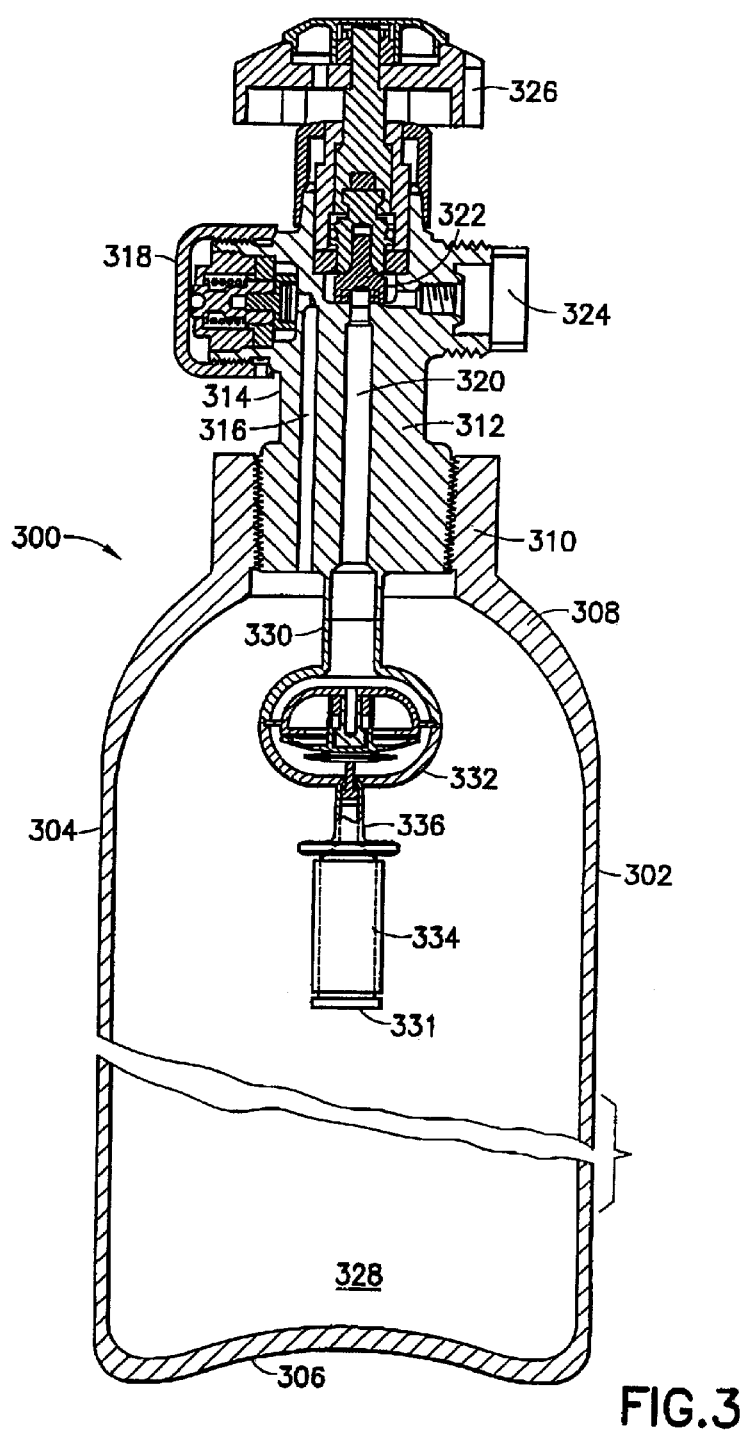
Figure 4:
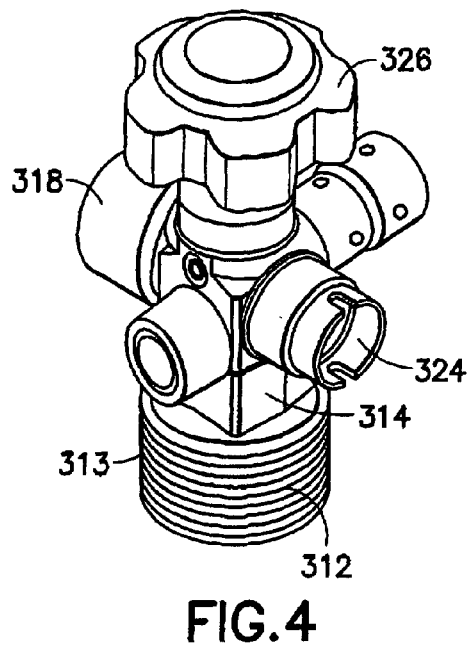
Figure 5:
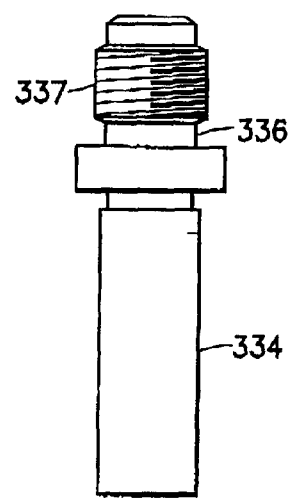
Figure 6:
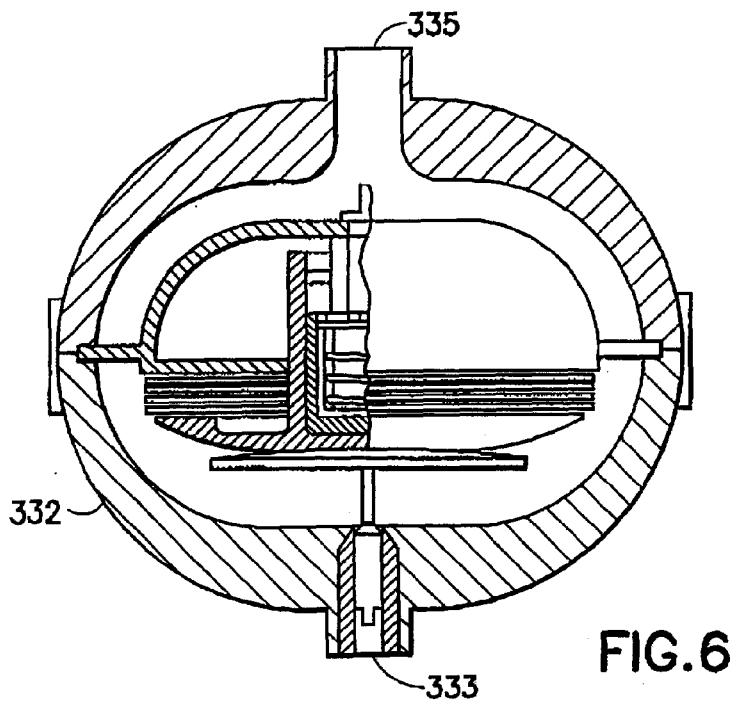

FIG. 7 is a sectional elevation view of an upper section of the fluid storage and dispensing vessel 302 of the FIG. 3 fluid storage and dispensing system 300. The illustrated portion of the vessel 302 includes the cylindrical wall 304, neck 308 and collar 310. The interior surface of the collar is threaded with threading 309 that is complementary to the threading 313 on the plug 312 of the valve head assembly 314 (see FIG. 4). The vessel may be formed of a stainless steel material or other ferrous metal alloy, or other metal or non-metal material of construction, fabricated as described hereinabove, and providing the >1 inch NGT neck opening and appropriate NGT threading.

The various features and aspects illustratively disclosed herein may be utilized separately or in various permutations or combinations with one another, to provide a fluid storage and dispensing system constituting a useful source fluid apparatus for specific usage requirements.

Thus, while the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

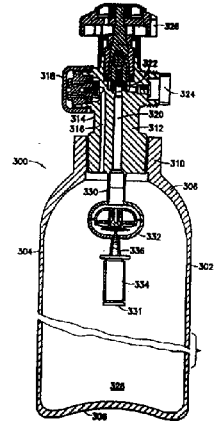

What is claimed is:

1. A fluid storage and dispensing system, comprising:
   a fluid storage and dispensing vessel enclosing an interior volume for holding a fluid, wherein the vessel includes a fluid flow port;
   a fluid dispensing assembly coupled in fluid flow communication with the port;
   a double-stage fluid pressure regulator associated with the port, and arranged to maintain a predetermined pressure in the interior volume of the vessel;
   the fluid dispensing assembly being selectively actuatable to flow gas, deriving from the fluid in the interior volume of the vessel, through the double-stage fluid pressure regulator and fluid dispensing assembly, for discharge of the gas from the vessel.

2. A system according to claim 1, wherein the double-stage fluid pressure regulator is interiorly disposed in the interior volume of the vessel.

3. A system according to claim 1, wherein the dispensing assembly includes a flow control valve operatively coupled with a valve actuator therefor, and an automatic controller for actuating the valve actuator to initiate adjustment of the valve for controlled discharge flow of gas deriving from fluid in the vessel.

4. A fluid storage and dispensing system according to claim 1, further comprising a liquid contained in the vessel interior volume selected from the group consisting of liquefied hydride gases and liquefied acid gases.

5. A fluid storage and dispensing system according to claim 1, further comprising a liquid contained in the vessel interior volume selected from the group consisting of arsine, phosphine, stibine, silane, diborane, hydrogen fluoride, boron trichloride, boron trifluoride, hydrogen chloride, halogenated silanes and disilanes.

6. A fluid storage and dispensing system according to claim 1, further comprising a liquid contained in the vessel interior volume selected from the group consisting of arsine, boron trichloride and boron trifluoride.

7. A fluid storage and gas dispensing system, comprising:
   a storage and dispensing vessel constructed and arranged for holding a liquid, whose vapor constitutes the fluid to be dispensed, wherein the fluid is contained in the storage and dispensing vessel, at a pressure at which the fluid is in a liquid state;
   the storage and dispensing vessel including a fluid flow port;
   a dispensing assembly coupled to the outlet port; and
   a double-stage fluid pressure regulator/particulate filter assembly interiorly disposed in the vessel; and
   a controller for selectively actuating the dispensing assembly to effect flow of gas deriving from the liquid in the vessel, through the fluid regulator/particulate filter assembly and the dispensing assembly, for discharge of the gas from the system.

8. A fluid storage and gas dispensing system according to claim 7, wherein the vessel contains a fluid selected from the group consisting of liquefied hydride gases and liquefied acid gases.

9. A semiconductor manufacturing system comprising a semiconductor manufacturing apparatus utilizing a gas, and a source of said gas, wherein said source comprises:
   a fluid storage and dispensing vessel enclosing an interior volume for holding a fluid, wherein the vessel includes a fluid flow port;
   a fluid dispensing assembly coupled in fluid flow communication with the port;
   a multi-stage fluid pressure regulator associated with the port, and arranged to maintain a predetermined pressure in the interior volume of the vessel;
   the fluid dispensing assembly being selectively actuatable to flow gas, deriving from the fluid in the interior volume of the vessel, through the fluid pressure regulator and fluid dispensing assembly, for discharge of the gas from the vessel.

10. A semiconductor manufacturing system according to claim 9, wherein the semiconductor manufacturing apparatus is selected from the group consisting of ion implantation chambers, chemical vapor deposition reactors, lithotracks units, bubblers, liquid delivery units, and cleaning equipment.

11. A method for storage and dispensing of a fluid, comprising:
   containing the fluid in a confined state against a multistage fluid pressure regulator in a fluid flow path closed to fluid flow downstream of the fluid pressure regulator, without flow control means between said fluid and said fluid pressure regulator; and
   selectively dispensing the confined fluid by opening the fluid flow path to fluid flow downstream of the fluid pressure regulator, and discharging fluid at a rate determined by the fluid pressure regulator.

12. A method according to claim 11, wherein the contained fluid is a liquid.

13. A method of manufacturing a semiconductor product, comprising:

containing the fluid in a confined state against a multistage fluid pressure regulator in a fluid flow path closed to fluid flow downstream of the fluid pressure regulator, without flow control means between said fluid and said fluid pressure regulator;

selectively dispensing the confined fluid by opening the fluid flow path to fluid flow downstream of the fluid pressure regulator, and discharging fluid at a rate determined by the fluid pressure regulator; and using the discharged fluid in the manufacture of the semiconductor product.

14. A method according to claim 13, wherein the use of the discharged fluid comprises ion implantation.

15. A method according to claim 13, wherein the use of the discharged fluid comprises chemical vapor deposition.

16. A fluid storage and dispensing system according to claim 11, wherein the fluid pressure regulator is arranged for discharge of the gas from the vessel at a subatmospheric pressure.

17. A fluid storage and dispensing system according to claim 11, wherein the fluid pressure regulator is arranged for discharge of the gas from the vessel at a pressure below 700 Torr.

18. A fluid storage and dispensing system comprising a vessel containing a physical adsorbent material having adsorbed thereon a gas at an internal pressure in the vessel of from about 50 psig to about 5000 psig, said vessel including a fluid flow port, with a fluid pressure regulator associated with the port, and a gas dispensing assembly coupled with the vessel and selectively operable to dispense gas from the vessel, with the fluid pressure regulator and gas dispensing assembly being arranged such that gas dispensed from the vessel flows through the fluid pressure regulator prior to flow through the gas dispensing assembly.

19. A fluid storage and dispensing system according to claim 18, wherein said gas comprises a gas species selected from the group consisting of hydride gases, halide gases and organometallic compound gases.

20. A fluid storage and dispensing system according to claim 18, wherein the vessel contains said gas in a free state as well as in an adsorbed state.

21. A fluid storage and dispensing system according to claim 18, wherein from about 5 to about 40% of said gas is present in a free state, and from about 60 to about 95% of said gas is present in an adsorbed state on the physical sorbent material.

22. A semiconductor manufacturing system comprising a semiconductor manufacturing apparatus utilizing a gas, and a source of said gas, wherein said source comprises a vessel containing a physical adsorbent material having adsorbed thereon a gas at an internal pressure in the vessel of from about 50 psig to about 5000 psig, said vessel having a fluid pressure regulator associated therewith, and a gas dispensing assembly coupled with the vessel and selectively operable to dispense gas from the vessel, wherein the fluid pressure regulator and fluid dispensing assembly are arranged such that fluid dispensed from the vessel flows through the fluid pressure regulator prior to flow through the fluid dispensing assembly.

23. A semiconductor manufacturing system according to claim 22, wherein the semiconductor manufacturing apparatus is selected from the group consisting of ion implantation chambers, chemical vapor deposition reactors, lithotracks units, bubblers, liquid delivery units, and cleaning equipment.

24. A method for storage and dispensing of a fluid, comprising:

containing the fluid in an at least partially adsorbed state at a pressure in the range of from about 50 to about 5000 psig, in a vessel having a fluid pressure regulator associated therewith and joined in fluid flow communication with a fluid dispensing assembly, wherein the fluid pressure regulator and fluid dispensing assembly are arranged such that fluid dispensed from the vessel flows through the fluid pressure regulator prior to flow through the fluid dispensing assembly; and selectively dispensing the fluid by desorbing same from the adsorbed state releasing same from containment for flow through the fluid pressure regulator prior to flow through the fluid dispensing assembly.

25. A method according to claim 24, further comprising using the fluid released from containment in a semiconductor manufacturing process.

26. A fluid storage and dispensing system, comprising a fluid storage and dispensing vessel enclosing an interior volume of less than about 50 liters and having an inlet opening larger than 1 inch NGT;

a fluid dispensing assembly arranged for selectively dispensing fluid from the vessel; and a fluid pressure regulator in the interior volume of the vessel, arranged to maintain a predetermined pressure therein.

27. A fluid storage and dispensing system according to claim 26, wherein the interior volume of said vessel is less than about 20 liters.

28. A fluid storage and dispensing system according to claim 26, wherein the interior volume of said vessel is less than about 10 liters.

29. A fluid storage and dispensing system according to claim 26, wherein the interior volume of said vessel is in the range of from about 1 to about 10 liters.

30. A fluid storage and dispensing system according to claim 26, wherein the pressure capability of the vessel is at least 1000 pounds per square inch.

31. A fluid storage and dispensing system according to claim 26, wherein the pressure capability of the vessel is at least 5000 pounds per square inch.

32. A fluid storage and dispensing vessel according to claim 26, wherein the inlet opening is 1½ inch NGT.

33. A fluid storage and dispensing vessel according to claim 26, wherein the inlet opening is 1½ inch NGT-11½ tpi.

34. A semiconductor manufacturing system comprising a semiconductor manufacturing apparatus utilizing a gas, and a source of said gas, wherein said source comprises:

a fluid storage and dispensing vessel enclosing an interior volume of less than about 50 liters and having an inlet opening larger than 1 inch NGT;

a fluid dispensing assembly arranged for selectively dispensing fluid from the vessel; and a fluid pressure regulator in the interior volume of the vessel, arranged to maintain a predetermined pressure therein.

35. A semiconductor manufacturing system according to claim 34, wherein the semiconductor manufacturing apparatus is selected from the group consisting of ion implantation chambers, chemical vapor deposition reactors, lithotracks units, bubblers, liquid delivery units, and cleaning equipment.

36. A fluid storage and dispensing vessel comprising a 2.0–2.25 liter DOT 3AA 2015 cylinder with a 1.5 inch NGT opening with a 1½–11½ NGT thread, a 4.187 to 4.25 inch outer diameter, a nominal wall thickness of 0.094 to 0.125 inch, and a length of 12.75 to 13.75 inches.

37. A fluid storage and dispensing assembly comprising a vessel with an interior volume less than 50 liters and a >1 inch NGT neck opening, a dispensing assembly coupled to the neck opening, a regulator coupled to the dispensing assembly and disposed in the interior volume of the vessel.

38. A fluid storage and dispensing assembly according to claim 37, wherein the neck opening is a 1.5 inch NGT neck opening.

39. A fluid storage and dispensing assembly according to claim 37, further comprising a particulate filter connected to the regulator, for preventing particulates from entering the fluid dispensing assembly.

40. A fluid storage and dispensing assembly according to claim 37, wherein the regulator comprises a multi-stage regulator.

41. A fluid storage and dispensing assembly according to claim 37, wherein the vessel holds a physical adsorbent material and a gas for which the physical adsorbent material has sorptive affinity.

42. A fluid storage and dispensing assembly according to claim 41, wherein the pressure in the interior volume of the vessel is greater than 50 psig.

43. A method for storage and dispensing of a fluid, comprising:
   containing the fluid in a confined state against a multi-stage fluid pressure regulator in a fluid flow path closed to fluid flow downstream of the fluid pressure regulator, wherein the fluid is contained in a vessel in which the multi-stage fluid pressure regulator is at least partially interiorly disposed; and
   selectively dispensing the confined fluid by opening the fluid flow path to fluid flow downstream of the fluid pressure regulator, and discharging fluid at a rate determined by the fluid pressure regulator.

* * * * *

UNITED STATES PATENT AND TRADEMARK OFFICE
CERTIFICATE OF CORRECTION

PATENT NO. : 6,089,027
DATED : July 18, 2000
INVENTOR(S) : Luping Wang and Glenn M. Tom It is certified that error appears in the above-identified patent and that said Letters Patent is hereby corrected as shown below:

The title page showing the illustrative figures should be deleted to be replaced with the attached title page.

Drawing sheets, consisting of Figs. 3 and 6, should be deleted to be replaced with the drawing sheets, consisting of Figs. 3 and 6, as shown on the attached page.

Column 4,
Line 62, change "inch" to -- inches --.

Column 8,
Line 8, change "inch" to -- inches --.

Column 9,
Line 65, change "5,158,528" to -- 5,518,528 --.

Column 10,
Line 2, change "kilogram" to -- kilograms --.

Column 16,
Lines 9 and 49, after "etc." insert -- , --.

Signed and Sealed this

First Day of April, 2003

JAMES E. ROGAN
*Director of the United States Patent and Trademark Office*

United States Patent
Wang et al.

[11] Patent Number: 6,089,027
[45] Date of Patent: *Jul. 18, 2000

[54] FLUID STORAGE AND DISPENSING SYSTEM

[75] Inventors: Luping Wang, Brookfield; Glenn M. Tom, New Milford, both of Conn.

[73] Assignee: Advanced Technology Materials, Inc., Danbury, Conn.

[*] Notice: This patent is subject to a terminal disclaimer.

[21] Appl. No.: 09/300,994

[22] Filed: Apr. 28, 1999

Related U.S. Application Data

[63] Continuation of application No. 09/067,393, Apr. 28, 1998.

[51] Int. Cl.[7] .............................. F17C 11/00; F17C 9/02
[52] U.S. Cl. .............................. 62/46.1; 62/48.1
[58] Field of Search .............................. 62/45.1, 46.1, 62/48.1, 49.1, 51.1

[56] References Cited

U.S. PATENT DOCUMENTS

| | | | |
|---|---|---|---|
| 1,659,263 | 2/1928 | Harris . | |
| 1,679,826 | 8/1928 | Jenkins . | |
| 2,047,339 | 7/1936 | Thomas | 221/73.5 |
| 2,354,283 | 7/1944 | St. Clair | 50/21 |
| 2,502,588 | 4/1950 | Preston et al. | 62/1 |
| 2,553,486 | 5/1951 | Thomas | 62/1 |
| 2,615,287 | 10/1952 | Senesky | 50/23 |
| 2,707,484 | 5/1955 | Rush | 137/460 |
| 2,793,504 | 5/1957 | Webster | 62/1 |
| 3,388,962 | 6/1968 | Baumann et al. | 431/344 |
| 3,590,860 | 7/1971 | Stenner | 137/495 |
| 3,699,998 | 10/1972 | Baranowski, Jr. | 137/327 |
| 3,791,412 | 2/1974 | Mays | 137/614.11 |
| 3,972,346 | 8/1976 | Wormser | 137/505.42 |
| 3,994,674 | 11/1976 | Baumann et al. | 431/354 |
| 4,173,986 | 11/1979 | Martin | 137/613 |
| 4,485,739 | 12/1984 | Emmett | 102/200 |
| 4,624,443 | 11/1986 | Eidsmore | 251/65 |
| 4,694,860 | 9/1987 | Eidsmore | 137/614.21 |
| 4,744,221 | 5/1988 | Knollmueller | 62/48.1 |
| 4,793,379 | 12/1988 | Eidsmore | 137/614.19 |
| 4,836,242 | 6/1989 | Coffre et al. | 137/505.42 |
| 5,230,359 | 7/1993 | Ollivier | 137/14 |
| 5,233,837 | 8/1993 | Callahan | 62/24 |
| 5,289,690 | 3/1994 | Rockenfeller et al. | 62/77 |
| 5,303,734 | 4/1994 | Eidsmore | 337/305.43 |
| 5,409,526 | 4/1995 | Zheng et al. | 96/132 |
| 5,518,528 | 5/1996 | Tom et al. | 95/103 |
| 5,547,229 | 8/1996 | Eidsmore | 285/93 |
| 5,566,713 | 10/1996 | Lhomer et al. | 137/613 |
| 5,595,209 | 1/1997 | Atkinson et al. | 137/116.5 |
| 5,645,192 | 7/1997 | Amidzich | 222/1 |
| 5,673,562 | 10/1997 | Friedt | 62/48.1 |
| 5,678,602 | 10/1997 | Cannet et al. | 137/505.25 |
| 5,685,159 | 11/1997 | Kooy et al. | 62/50.1 |
| 5,692,381 | 12/1997 | Garrett | 62/60 |
| 5,694,975 | 12/1997 | Eidsmore | 137/489.5 |
| 5,752,544 | 5/1998 | Yves | 137/61 |
| 5,762,086 | 6/1998 | Ollivier | 137/1 |
| 5,901,557 | 5/1999 | Grayson | 62/45.1 |

OTHER PUBLICATIONS

ANSI/CGA V–1–1994 American National/Compressed Gas Association, Standard for Compressed Gas Cylinder Valve Outlet and Inlet Connections, Compressed Gas Assoc., Inc.
Integrated Flow Systems Inc., SR4 and SR3 Series Regulators with Operation and Features, 1700 Granite Creek Road, Santa Cruz, CA 95065.

*Primary Examiner*—William Doerrler
*Attorney, Agent, or Firm*—Steven J. Hultquist; Oliver A. M. Zitzmann

[57] ABSTRACT

A fluid storage and dispensing system comprising a vessel for holding a fluid at a desired pressure. The vessel has a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature. In another aspect, the vessel contains a solid-phase sorbent material having sorbable gas adsorbed thereon, at a pressure in excess of 50 psig. The vessel may have a >1 inch NGT threaded neck opening, to accommodate the installation of an interior regulator.

43 Claims, 5 Drawing Sheets